United States Patent
Faure et al.

(10) Patent No.: US 12,489,819 B2
(45) Date of Patent: Dec. 2, 2025

(54) ACCESS CONTROLLER FOR A THREE-DIMENSIONAL CONTENT SYSTEM

(71) Applicant: BULL SAS, Les Clayes-sous-Bois (FR)

(72) Inventors: Patrick Faure, Chambery (FR); Julien Clapot, Villard Bonnot (FR); Gabriel Marcelino, Grenoble (FR)

(73) Assignee: BULL SAS, Les Clayes-sous-Bois (FR)

( * ) Notice: Subject to any disclaimer, the term of this patent is extended or adjusted under 35 U.S.C. 154(b) by 20 days.

(21) Appl. No.: 18/762,570

(22) Filed: Jul. 2, 2024

(65) Prior Publication Data
US 2025/0016235 A1 Jan. 9, 2025

(30) Foreign Application Priority Data
Jul. 6, 2023 (EP) .................................... 23306143

(51) Int. Cl.
*H04L 67/141* (2022.01)
*H04L 9/40* (2022.01)
*H04L 67/143* (2022.01)

(52) U.S. Cl.
CPC ............ *H04L 67/141* (2013.01); *H04L 63/08* (2013.01); *H04L 67/143* (2013.01)

(58) Field of Classification Search
None
See application file for complete search history.

(56) References Cited

U.S. PATENT DOCUMENTS 9,271,131 B2 * 2/2016 Ireland ................. H04L 67/306
2017/0366616 A1 * 12/2017 Rodrigues Nascimento ...............
H04W 4/44
2020/0228524 A1 7/2020 Szafranski et al.
2021/0124757 A1 * 4/2021 Fu ......................... G06F 16/214
2022/0351469 A1 11/2022 Pan

FOREIGN PATENT DOCUMENTS

CN 111460407 7/2020
EP 3495949 6/2019

OTHER PUBLICATIONS

European Search Report issued in EP23306143 on Dec. 11, 2023 (5 pages).

* cited by examiner

*Primary Examiner* — Quang N Nguyen
(74) *Attorney, Agent, or Firm* — ARC IP Law, PC; Joseph J. Mayo

(57) ABSTRACT

The invention relates to a method for allowing at least one virtual reality device to access a data platform of a three-dimensional content system, said method comprising in particular the steps of receiving a cryptographic footprint on a control communication link (CCL), receiving a cryptographic footprint of an application stored on the at least one virtual reality device sent by said at least one virtual reality device on a access communication link (ACL), comparing both received cryptographic footprints, sending a network address of a selected application environment and authentication data to the virtual reality device on the access communication link (ACL), creating, by the at least one virtual reality device, a secured communication between said at least one virtual reality device and the selected application environment.

14 Claims, 2 Drawing Sheets

ACCESS CONTROLLER FOR A THREE-DIMENSIONAL CONTENT SYSTEM

This application claims priority to European Patent Application Number 23306143.1, filed 6 Jul. 2023, the specification of which is hereby incorporated herein by reference.

BACKGROUND OF THE INVENTION

Technical Field of the Invention

At least one embodiment of the invention relates to data platforms and systems and more particularly to an access controller for a three-dimensional content system and a method for securely accessing a three-dimensional content.

Description of the Related Art

In order for a content created by a provider to be deployed on a data platform, i.e. put into production, the platform operator must take it through several stages: testing, then preproduction (or validation), optionally staging (e.g. validation by the client), and finally production. Within the platform, each stage is managed by a separate environment: a test environment, a preproduction environment, optionally a staging environment and a production environment.

When the new content is a three-dimensional content, the user in charge of the test, validation and deployment of the new three-dimensional content must use an application installed on a virtual reality device, such as e.g. a virtual reality helmet, in communication with the platform to validate the content at each stage. For each stage, the version of the application installed on the virtual reality device shall be compatible with the corresponding environment.

Such an operation implies trusting the user entirely regarding the use of the correct version of the application on the virtual reality device, which is not satisfactory from a security point of view as the user could use a version of the application which does not match with the environment that the user wants to use at a given time.

Such an operation also implies the creation of a secured link between the virtual reality device and the platform that shall be managed by the platform operator, which may be complex to implement and operate.

It is therefore an object of the invention to provide a method for securing a three-dimensional data platform.

BRIEF SUMMARY OF THE INVENTION

To this end, at least one embodiments of the invention concerns a method for allowing at least one virtual reality device to access a data platform of a three-dimensional content system, said three-dimensional content system comprising said data platform, at least one identification portal, said at least one virtual reality device and an access controller, said at least one virtual reality device being intended to be used by a user and being configured to communicate with the access controller on an access communication link and with the data platform on a data communication link, an application characterized by a cryptographic footprint being installed on said virtual reality device for using a content installed on said data platform, the data platform comprising a plurality of application environments configured each for storing a set of data of a content and a copy of said cryptographic footprint of the application installed on the virtual reality device and for communicating with the access controller on a control communication link, said at least one identification portal being configured to communicate with the user via a network equipment on a first identification communication link to identify the user and select one of the application environments that the user is allowed to communicate with based on said user's profile, said at least one identification portal being configured to communicate with the user via the virtual reality device on a second identification communication link to identify the user and further authorize a communication with the access controller, said at least one identification portal being configured to communicate with the data platform on a request communication link, said method comprising the steps of:

identifying, by the identification portal, using the network equipment, via the first identification communication link, the user of the at least one virtual reality device, selecting, by the identification portal, based on the user's profile, one of the application environments, notifying, by the network equipment, to the data platform, on the request communication link, said selected application environment, sending, by the selected application environment, to the access controller on the control communication link, a copy of the cryptographic footprint stored on said selected application environment, and receiving, by the access controller, said sent cryptographic footprint by the access controller on the control communication link, activating, by the access controller, a session for the authenticated user to access the selected application environment, identifying, by the identification portal, via the second identification communication link, the user using the virtual reality device during the activated session, receiving, by the access controller, via the access communication link, the cryptographic footprint of the application installed on the at least one virtual reality device sent by said at least one virtual reality device, comparing, by the access controller, both received cryptographic footprints, sending, by the access controller, via the access communication link, a network address of the selected application environment and authentication data to the virtual reality device, creating, by the at least one virtual reality device, a secured data communication link between said at least one virtual reality device and the selected application environment.

The method according to at least one embodiment of the invention allows to ensure the use of the correct version of the application installed on the virtual reality device with the application environment that the user is allowed to access. The access controller allows creating a hub that manages all communications between the data platform and the outside world, checking with the data platform that the version of the application installed on the virtual reality device is compatible with the application environment that the user wants to access to and allows the creation of a secured communication between the virtual reality device and the selected authorized application.

For example, the application environments may comprise a test environment, a pre-production environment, a staging environment and/or the production environment.

Preferably, the step of identifying the user comprises the authentication of said user.

Advantageously, the session is activated for the user for a predetermined duration.

Still advantageously, the method comprises a step of, prior to the activation of the session, checking if a session is already active for the given user and of deleting the active session.

In an embodiment, the identification of the user via the first or the second identification communication link is performed by the identification portal using an internal identity provider module configured to authenticate the user of the at least one virtual reality device.

In another embodiment, the identification of the user via the first or the second identification communication link is performed by the identification portal via an external identity provider module configured to authenticate the user of the at least one virtual reality device.

At least one embodiment of the invention also relates to a computer program comprising instructions which, when the program is executed by a computer, cause the computer to carry out the steps of the method as described here before.

At least one embodiment of the invention also relates to an access controller for a three-dimensional content system, said three-dimensional content system comprising a data platform, at least one identification portal, at least one virtual reality device and an access controller, said at least one virtual reality device being intended to be used by a user and being configured to communicate with the access controller on an access communication link and with the data platform on a data communication link, an application characterized by a cryptographic footprint being installed on said virtual reality device for using a content installed on said data platform, the data platform comprising a plurality of application environments configured each for storing a set of data of a content and a copy of the cryptographic footprint of the application installed on the virtual reality device and for communicating with the access controller on a control communication link, said at least one identification portal being configured to communicate with the user via a network equipment on a first identification communication link to identify said user and select one of the application environments that the user is allowed to communicate with based on said user's profile, said at least one identification portal being configured to communicate with the user on a second identification communication link to identify said user via the virtual reality device and further authorize a communication with the access controller, said at least one identification portal being configured to communicate with the application environments hosted on the data platform on a request communication link, said access controller being configured to:
- receive a cryptographic footprint sent by a selected application environment on the control communication link,
- activate a session for an authenticated user to access the selected application environment,
- receive a cryptographic footprint of the application installed on the at least one virtual reality device sent by said at least one virtual reality device via the access communication link,
- compare both received cryptographic footprints,
- send a network address of the selected application environment to the virtual reality device on the access communication link for said at least one virtual reality device to create a secured data communication link between said at least one virtual reality device and the selected application environment.

Preferably, the access controller is configured to activate a session for a predetermined time duration.

Preferably, the access controller is configured to, prior to activating a session, check if a session is already active for the given user and to delete the active session.

At least one embodiment of the invention also relates to a three-dimensional content system three-dimensional content system for at least one virtual reality device, said three-dimensional content system comprising a data platform, at least one identification portal, at least one virtual reality device and an access controller according to any of the preceding claims, said at least one virtual reality device being intended to be used by a user and being configured to communicate with the access controller on an access communication link and with the data platform on a data communication link, an application characterized by a cryptographic footprint being installed on said virtual reality device for using a content installed on said data platform, the data platform comprising a plurality of application environments configured each for storing a set of data of a content and a copy of the cryptographic footprint of the application stored on the virtual reality device and for communicating with the access controller on a control communication link, said at least one identification portal being configured to communicate with the user via a network equipment on a first identification communication link to identify said user and select one of the application environments that the user is allowed to communicate with based on said user's profile, said at least one identification portal being configured to communicate with the user on a second identification communication link to identify said user via the virtual reality device and further authorize the communication with the access controller, said at least one identification portal being configured to communicate with the application environments hosted on the data platform on a request communication link.

In an embodiment, the access controller is internal to the data platform.

In another embodiment, the access controller is external to the data platform.

According to an embodiment, the identification portal is configured to identify the user via the first or the second identification communication link using an internal identity provider module, said internal identity provider module being configured to authenticate the user of the at least one virtual reality device.

According to an embodiment, the identification portal is configured to identify the user via the first or the second identification communication link via an external identity provider module, said external identity provider module being configured to authenticate the user of the at least one virtual reality device.

BRIEF DESCRIPTION OF THE DRAWINGS

These and other features, aspects, and advantages of at least one embodiment of the invention are better understood with regards to the following Detailed Description, Claims, and accompanying Figures, where:

DETAILED DESCRIPTION OF THE INVENTION

Figure 1:
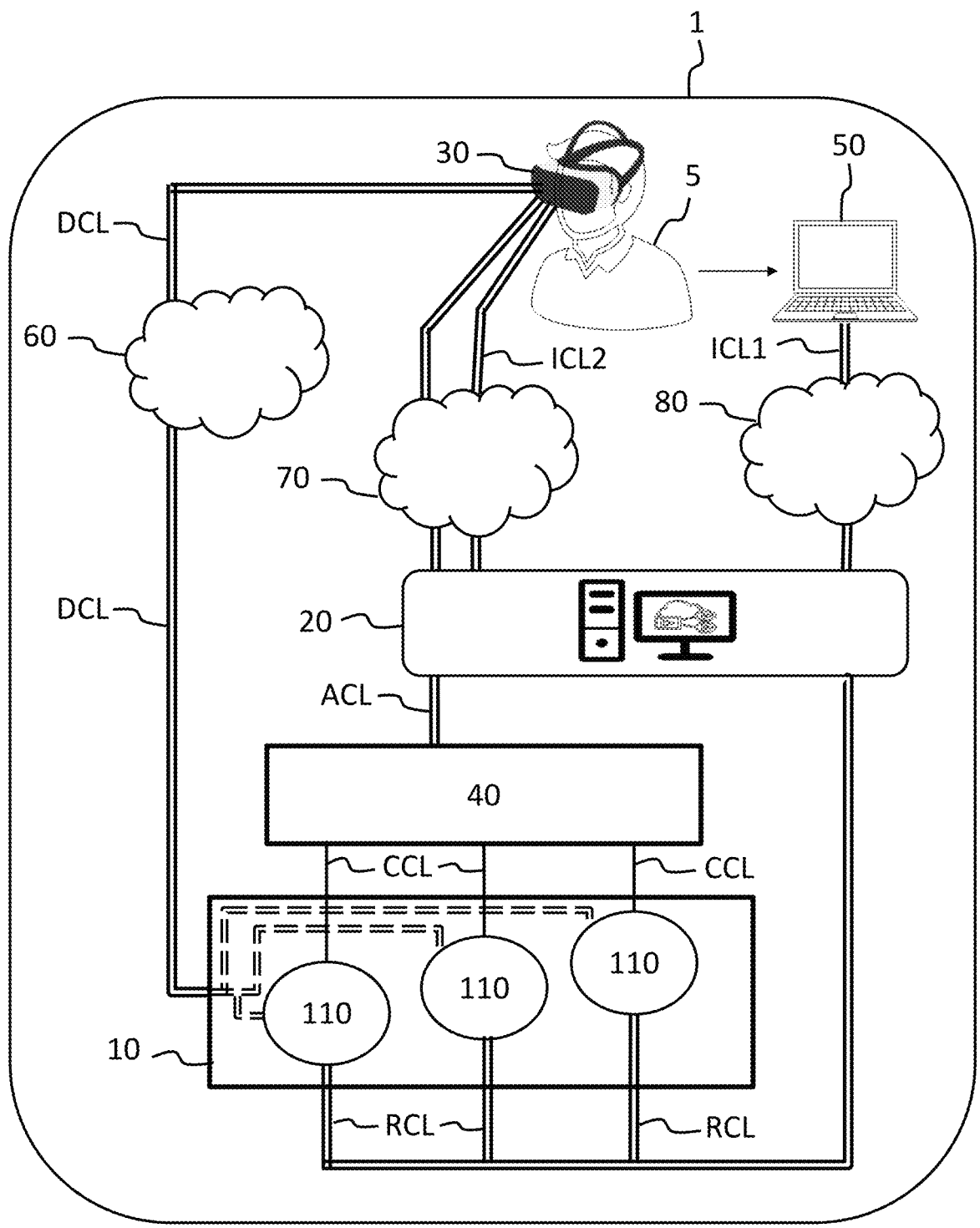
FIG. 1 schematically illustrates an embodiment of the system according to at least one embodiment of the invention.
Figure 2:
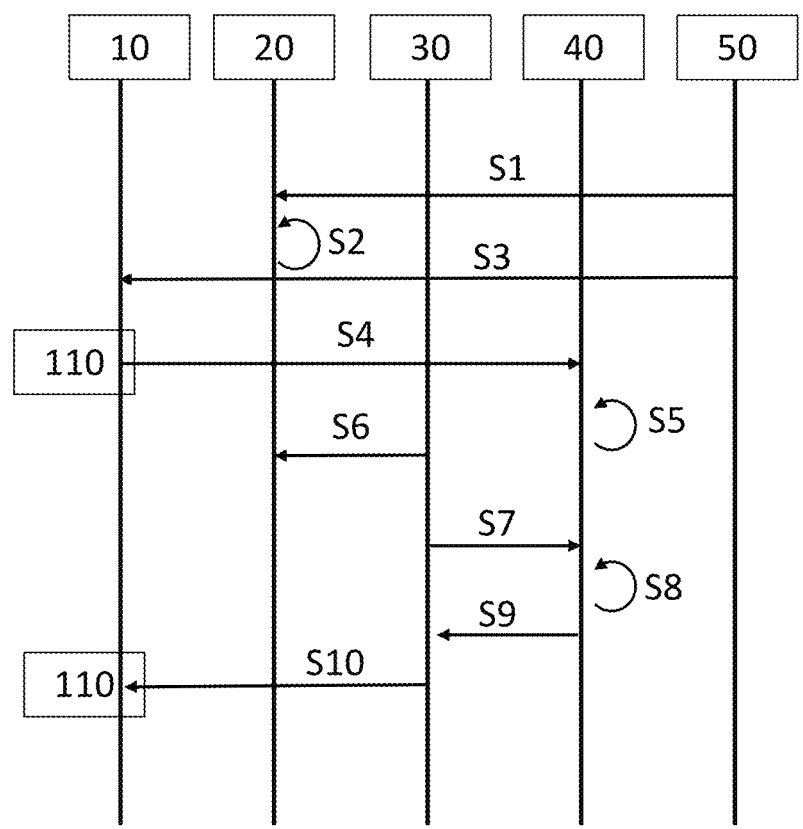
FIG. 2 schematically illustrates an embodiment of the method according to at least one embodiment of the invention.

FIG. 1 describes an example of a three-dimensional content system 1 according to at least one embodiment of the invention.

System 1

The three-dimensional content system 1 comprises a data platform 10, an identification portal 20, a virtual reality device 30 intended to be used by a user 5, an access controller 40 and a network equipment 50.

Data Platform 10

The data platform 10 comprises a plurality of application environments 110.

Each application environment 110 is configured to store a set of data of a content used with an application installed on the virtual reality device 30 and a copy of the cryptographic footprint of the application stored on the virtual reality device 30 as described here after.

Each application environment 110 is configured to communicate with the access controller 40 on a control communication link CCL.

Preferably, the data platform 10 comprises several application environments 110 such as a test environment, a pre-production environment and a production environment. The test environment allows the user 5 to test the content using the virtual reality device 30. The pre-production environment allows the user 5 to validate the content using the virtual reality device 30. The production environment allows the user to use the content as a service using the virtual reality device 30.

Identification Portal 20

The identification portal 20 stores the profile of the users 5 authorized to access the data platform 10. The profile of each user 5 indicates which application environment 110 can be accessed by said user 5.

The identification portal 20 is configured to communicate with the user 5 on a first identification communication link ICL1 through the network equipment 50 and with the user 5 on a second identification communication link ICL2 through the virtual reality device 30, to identify the user 5 in two different manners. The identification portal 20 may be a web site accessible through the Internet.

The identification portal 20 is configured to select one of the application environments 110 that the user 5 is allowed to communicate with based on said user's profile and with one of the application environments hosted on the data platform 10 on a request communication link RCL. Each user 5 is only allowed to access one and only one application environment 110 at a time with a given identifier. A user 5 may be able to access different application environments 110, at different times, using different identifiers.

The identification portal 20 may be a unique physical entity or comprises several entities, one per application environment 110.

Virtual Reality Device 30

For example, the virtual reality device 30 is a virtual reality helmet.

The virtual reality device 30 stores a version of an application characterized by a cryptographic footprint or data footprint. The cryptographic footprint may for example be the hash of the application. The hash, known from the skilled person as such, consists in assigning a numeric or alphanumeric string to (a piece of data) by applying a function whose output values are all the same number of bits in length.

This application installed on the virtual reality device 30 allows using the content installed on one of the application environments 110 through a user session.

The virtual reality device 30 is configured to communicate with the identification portal 20 on the second identification communication link ICL2 to identify the user 5 and with the access controller 40 on an access communication link ACL once, and only once, the user 5 has been identified via the second identification communication link ICL2.

The virtual reality device 30 is configured to communicate with an application environment 110 hosted on the data platform 10 on a data communication link DCL via a first communication network 60 using a network address of the selected application environment 110 received from the access controller 40 after identification.

Access Controller 40

The access controller 40 is configured to receive a cryptographic footprint sent by one of the application environments 110 of the data platform 10 on the control communication link CCL, said cryptographic footprint allowing to identify the version of the application installed on the application environment 110 that sent it. The cryptographic footprint is sent to the access controller 40 once the user has been identified using the network equipment 50 and by the application environment 110 the user 5 is authorized to access to. The access controller 40 is then configured to activate a session for the user 5 allowing the user 5 to access said application environment 110.

The access controller 40 is configured to receive the cryptographic footprint of the application stored on the virtual reality user device 30 sent by said virtual reality device 30 on the access communication link ACL via a second communication network 70, said cryptographic footprint allowing to identify the version of the application installed on the virtual reality device 30. The cryptographic footprint is sent by the virtual reality device once the user 5 has been identified using the virtual reality device 30, The access controller 40 is configured to compare both cryptographic footprints received respectively on the control communication link CCL and on the access communication link ACL.

The access controller 40 is configured to send a network address of said application environment 110 to the virtual reality device 30 on the access communication link ACL for said at least one virtual reality device 30 to create a secured communication between said at least one virtual reality device 30 and said application environment only if the session is valid (i.e. if the identification portal 20 confirms that the user can access the associated application environment 110).

The access controller 40 comprises one or several processors that implement the technical functions mentioned hereabove.

Network Equipment 50

The network equipment 50 can be any suitable device able to trigger the creation of a new session or the activation of an existing session with one of the application environments 110. The network device 50 may for example be a smartphone or a computer, such as e.g. a laptop.

The network device 50 is configured to allow the user 5 to connect to the identification portal 20 via a third communication network 80 to create a new session or continue with an existing session.

First Communication Network 60

The first communication network 60 allows the communication between the virtual reality device 30 and one of the application environments 110 through a data communication link DCL. The first communication network 60 may be the Internet.

Second Communication Network 70

The second communication network 70 allows the communication between the virtual reality device 30 and the identification portal 20 through the second identification communication link ICL2, and between the virtual reality device 30 and the access controller 40 through the access communication link ACL. The second communication network 70 may be the Internet.

Third Communication Network 80

The third communication network 80 allows the communication between the network equipment 50 and the identification portal 20 through the first identification communication link ICL1. The third communication network 80 may be the Internet.

The first communication network 60, the second communication network 70 and the third communication network 80 may be three separated communication network physical entities or two separated communication network physical entities or be one same communication network physical entity.

EXAMPLE OF OPERATION

In a step S1, the user 5 connects to the identification portal 20 using an identifier and a password via the network equipment 50 and the first identification communication link ICL1 created through the third communication network 80.

The user 5 is then identified by the identification portal 20. The identification comprises here authenticating the user 5.

Once the user 5 has been identified on the identification portal 20, the identification portal 20 retrieves the profile associated with said user 5 in its memory zone to determine which application environment 110 the user 5 is allowed to access in a step S2. The identification credentials of the user 5 allow said user to access only one of the application environments 110 at a time by the creation of a unique session between the user 5 and the allowed application environment 110.

Once an application environment 110 has been selected based on the user's profile and rights, the network equipment 50 notifies the selected application environment 110 via the request communication link RCL in a step S3.

The selected application environment 110 sends to the access controller 40 via the control communication link CCL a copy of the cryptographic footprint stored on said selected application environment 110, which corresponds to a given application on the virtual reality device 30 and which is received via the control communication link CCL by the access controller 40 in a step S4.

Then in a step S5, the access controller 40 checks if a session is already opened for the user 5, deletes all opened sessions and activates a new session for the user 5 to access the selected application environment 110. Preferably, the session is opened for a predetermined duration, for example a few dozen of minutes.

Then, in a step S6, the user 5 connects to the identification portal 20 using an identifier and a password via the virtual reality device 30 and the second identification communication link ICL2 created through the second communication network 70. The user 5 is then identified by the identification portal 20 through the second communication network 70. The identification comprises here authenticating the user 5.

Then, in a step S7, when the user 5 has been identified, the virtual reality device 30 sends the cryptographic footprint of the application stored on said virtual reality device 30 on the access communication link ACL, which is received by the access controller 40.

In a step S8, the access controller 40 compares the cryptographic footprint received on the control communication link CCL and the cryptographic footprint received on access communication link ACL.

If both cryptographic footprints are identical, which means that the version of the application stored on the virtual reality device 30 is compatible with the targeted application environment 110 (i.e. the application stored on the virtual reality device 30 has not been altered or modified by the user 5), and if the credentials of the user 5 are still valid for the current session, the access controller 40 sends in a step S9 the network address of the selected application environment 110, and optionally authentication data to secure the data communication link DCL, to the virtual reality device 30 on the access communication link ACL.

In a step S10, the virtual reality device 40 establishes a communication, preferably secured, on the data communication link DCL with the selected application environment 110 using the network address in order to communicate with said application environment 110, for example to use data or modify data or add new data stored in said application environment 110.

At least one embodiment of the invention allows therefore to guarantee that the two versions used on the virtual reality device 30 is the same as the one that was originally installed and indexed on the application environment 110 that the user 5 is allowed to access.

The invention claimed is:

1. A three-dimensional content system comprising:
    a data platform,
    at least one identification portal,
    at least one virtual reality device and an access controller,
    said at least one virtual reality device being intended to be used by a user and being configured to communicate with the access controller on an access communication link (ACL) and with the data platform on a data communication link (DCL),
    an application comprising a cryptographic footprint being installed on said at least one virtual reality device for using a content installed on said data platform,
    the data platform comprising a plurality of application environments each configured for storing a set of data of said content and a copy of the cryptographic footprint of the application stored on the at least one virtual reality device and configured to communicate with the access controller on a control communication link (CCL),
    said at least one identification portal being configured to communicate with the user via a network equipment on a first identification communication link (ICL1) to identify said user and select one application environment from the plurality of application environments that the user is allowed to communicate with based on a profile of said user,
    said at least one identification portal being configured to communicate with the user on a second identification communication link (ICL2) to identify said user via the at least one virtual reality device and further authorize communication with the access controller, and
    said at least one identification portal being configured to communicate with the data platform on a request communication link (RCL).

2. The three-dimensional content system according to claim 1, wherein the access controller is internal to the data platform.

3. The three-dimensional content system according to claim 1, wherein the access controller is external to the data platform.

4. The three-dimensional content system according to claim 1, wherein the at least one identification portal is configured to identify the user via the first identification communication link or the second identification communication link using an internal identity provider module configured to authenticate the user of the at least one virtual reality device.

5. The three-dimensional content system according to claim 1, wherein the at least one identification portal is configured to identify the user via the first identification communication link or the second identification communication link via an external identity provider module configured to authenticate the user of the at least one virtual reality device.

6. The three-dimensional content system of claim 1 wherein said access controller is configured to:
   receive a first cryptographic footprint sent by a selected application environment on the control communication link,
   activate a session for an authenticated user to access the selected application environment,
   receive a second cryptographic footprint of the application installed on the at least one virtual reality device sent by said at least one virtual reality device via the access communication link,
   compare said first cryptographic footprint and said second cryptographic footprint, and
   send a network address of the selected application environment to the at least one virtual reality device on the access communication link for said at least one virtual reality device to create a secured data communication link between said at least one virtual reality device and the selected application environment.

7. The three-dimensional content system according to claim 6, said access controller being configured to activate said session for a predetermined time duration.

8. The three-dimensional content system according to claim 6, said access controller being configured to, prior to activating said session, check if said session is already active for a given user and to delete said session.

9. A method for allowing said at least one virtual reality device to access said data platform of the three-dimensional content system of claim 1, said method comprising:
   identifying, by the at least one identification portal, using the network equipment, via the first identification communication link, the user of the at least one virtual reality device,
   selecting, by the at least one identification portal, based on the profile of said user, a selected application environment comprising said one application environment selected from said plurality of application environments,
   notifying, by the network equipment, to the data platform, on the request communication link, said selected application environment,
   sending, by the selected application environment, to the access controller, on the control communication link, said copy of the cryptographic footprint stored on said selected application environment, and receiving, by the access controller, said cryptographic footprint that was sent on the control communication link,
   activating, by the access controller, a session for an authenticated user to access the selected application environment,
   identifying, by the at least one identification portal, via the second identification communication link, the user using the at least one virtual reality device during the session that is activated,
   receiving, by the access controller, via the access communication link, the cryptographic footprint of the application installed on the at least one virtual reality device sent by said at least one virtual reality device,
   comparing by the access controller, both received cryptographic footprints,
   sending, by the access controller, via the access communication link, a network address of the selected application environment and authentication data to the at least one virtual reality device, and
   creating, by the at least one virtual reality device, a secured data communication link between said at least one virtual reality device and the selected application environment.

10. The method according to claim 9, wherein identifying the user comprises authentication of said user.

11. The method according to claim 9, wherein the session is activated for the user for a predetermined duration.

12. The method according to claim 11, further comprising, prior to activation of the session, checking if the session is already active for a given user and of deleting the session that is active.

13. The method according to claim 9, wherein identification of the user via the first identification communication link or the second identification communication link is performed by the at least one identification portal using an internal identity provider module configured to authenticate the user of the at least one virtual reality device.

14. The method according to claim 9, wherein identification of the user via the first identification communication link or the second identification communication link is performed by the at least one identification portal via an external identity provider module configured to authenticate the user of the at least one virtual reality device.

* * * * *